United States Patent [19]
Macke et al.

[11] Patent Number: 5,379,867
[45] Date of Patent: Jan. 10, 1995

[54] RE-ADJUSTING MECHANISM FOR A DISC BRAKE

[75] Inventors: Wlodzimierz Macke, Viernheim; Hellmut Jäger, Edingen-Neckarhausen; Rainer Baumgärtner, Mannheim, all of Germany

[73] Assignee: Deutsche Perrot-Bremse GmbH, Mannheim, Germany

[21] Appl. No.: 57,756

[22] Filed: May 7, 1993

[30] Foreign Application Priority Data

| May 8, 1992 | [DE] | Germany | 4215200 |
| Mar. 5, 1993 | [DE] | Germany | 4307017 |
| Mar. 24, 1993 | [DE] | Germany | 4244673 |

[51] Int. Cl.⁶ .................. F16D 13/75; F16D 55/16; F16D 65/56
[52] U.S. Cl. .................. 188/71.9; 188/72.9; 188/196 BA; 192/111 T
[58] Field of Search ............ 188/71.1, 71.2, 71.7–71.9, 188/72.7–72.9, 196 R, 196 B, 196 BA, 196 D, 196 V; 192/111 T

[56] References Cited

U.S. PATENT DOCUMENTS

| 321,708 | 7/1885 | Gardner . | |
| 3,830,343 | 8/1974 | Gardner | 188/71.8 |
| 5,161,648 | 11/1992 | Taig | 188/196 DX |
| 5,161,650 | 11/1992 | Taig | 188/71.9 X |

FOREIGN PATENT DOCUMENTS

| 1951312 | 4/1970 | Germany . |
| 2400470 | 7/1974 | Germany . |
| 2507012 | 8/1975 | Germany . |
| 2409812 | 9/1975 | Germany . |
| 2817389 | 11/1978 | Germany . |
| 3423875 | 1/1985 | Germany . |
| 3610569 | 10/1987 | Germany . |
| 3716202 | 11/1988 | Germany . |
| 4034165 | 12/1991 | Germany . |
| 4020485 | 1/1992 | Germany . |
| 4032886 | 4/1992 | Germany . |
| 1492784 | 11/1977 | United Kingdom . |
| 1494961 | 12/1977 | United Kingdom . |
| 1595492 | 8/1981 | United Kingdom . |
| 2142697 | 1/1985 | United Kingdom . |
| WO91/19115 | 12/1991 | WIPO . |
| WO92/00466 | 1/1992 | WIPO . |
| WO92/07201 | 4/1992 | WIPO . |

*Primary Examiner*—Robert J Oberleitner
*Assistant Examiner*—Alfred Muratori
*Attorney, Agent, or Firm*—Jacobson, Price, Holman & Stern

[57] ABSTRACT

An operating mechanism (17) for a sliding caliper disc brake including a caliper housing (1) a thrust element (9) slidably mounted in the housing for reciprocating movement toward and away from a disc brake (2), two thrust spindles (10, 11) in screw threaded engagement in the thrust element (9) each having on their ends caliper feet (12, 13) engaging against a brakehead on which brake linings (3) are mounted, a brake shaft (8) rotatably mounted in the housing (1) so that rotation of the brake shaft about an axis of rotation (B) in an actuating direction moves the thrust element (9) toward the brake disc and rotation in the opposite direction retracts the thrust element, a force-dependent freewheeling clutch drive (18) coupled on one side to the brake shaft (8) and on the other side to the thrust spindles (10, 11), a recess (16) in the brake shaft (8), and an operating mechanism (17) for coupling the clutch drive (18) to the thrust spindles (10, 11) having an operating shaft (25) extending through the recess (16) and through the driven operating ring (21) of the clutch drive, the operating ring having an internal profile interengaging with an external profile on shaft (25) with limited relative rotational movement therebetween provided by gap (S) which determines the brake clearance in the non-actuated position. Bevel gears (26, 27) on operating shaft (25) engaging with double gears (29, 30) on actuating shafts (31, 32) for operating the thrust spindles (10, 11) during use for maintaining proper brake clearance.

20 Claims, 3 Drawing Sheets

RE-ADJUSTING MECHANISM FOR A DISC BRAKE

BACKGROUND OF THE INVENTION

The invention relates to an operating mechanism for a disc brake, particularly a sliding-caliper disc brake.

An operating mechanism of the type described above is known from German Patent No. OS 40 32 886 A1. In this known mechanism, at least one operating mechanism is disposed with an axial orientation inside one of the thrust spindles. The operating mechanism is mounted with an elongation of the holding opening of the caliper housing. For uniform application of the thrust spindles, a so called synchronization device in the form of an endless toothed belt is provided. The system for accommodating the toothed belt is very costly and requires a separate installation space. Moreover, additional installation space is required to accommodate the elongation of the operating mechanism.

The toothed belt has a certain elasticity, in addition to which vibration of segments of the belt between cogwheels is possible. Therefore the operating mechanism cannot operate with the desired precision.

German Patents Nos. OS 40 34 165 A1 and 40 20 485 A1 disclose operating mechanisms which are very similar to that described above (i.e., the mechanism of German Patent No. OS 40 32 886). In both cases, a synchronizing mechanism with a toothed belt is employed.

Other operating mechanisms with synchronization by toothed belts are disclosed in German Patents No. 36 10 569 and 37 16 202.

The state of the art from which the present inventive operating mechanism departs operates in a force-dependent fashion. Other mechanisms operate in an excursion-dependent fashion and are thus also relevant art. These are disclosed in German Patent No. 34 23 875; U.S. Pat. No. 3,830,343; and German Patent No. 24 00 470, 24 09 812, 25 07 012; and 28 17 389. In this connection, German Patent No. 19 51 312 should also be mentioned, according to which the operating mechanism is housed in the caliper housing on the radially outward or rim side. This results in an undesirable axial lengthening of the brake on this side. Further, because of the excursion dependence of the application, rather than pure force dependence, intentioned application of the brakes can occur in the case of temporary deformations of the caliper housing.

BRIEF SUMMARY OF THE INVENTION

The object of the invention is to provide an operating mechanism of the type described initially above, which mechanism requires minimal additional installation space and enables precise, force dependent application of the brakes, with synchronization of the rotation of the thrust spindles.

This object is achieved according to the invention by an operating shaft which extends concentrically to the rotational axis of the brake shaft, namely the operating shaft extends through a recess in the brake shaft, and the operating shaft serves to rotationally couple the freewheeling clutch drive to the thrust spindles.

No additional overall installation space is required in order to house the operating shaft inside the brake shaft.

The operating shaft is coupled to both thrust spindles, so as to obviate a synchronizing device in the form of a toothed belt. The benefits of this include further minimization of the overall installation space and elimination of the above-mentioned problems connected with the elasticity of the toothed belt.

In addition, the invention ensures precise and synchronous rotation of the thrust spindles to achieve application of the brakes.

The freewheeling clutch drive may be disposed anywhere in the region of the brake, as long as effective connections are provided to the brake shaft and to the operating shaft. It is preferred according to the invention that the freewheeling clutch drive also be housed inside the recess in the brake shaft; this results in still further reduction of the overall installation space.

If during braking, one of the caliper feet which may be provided on the end of the thrust spindles and directed toward the brake lining, may develop a cant, this situation may lead to rotation of the caliper foot around its middle axis, in that the peripheral brake forces, i.e. forces acting on the periphery of the foot, may produce a lateral relative movement between the caliper foot and thrust spindle, on the one hand, and the brake lining on the other. If, as is the case with the state of the art devices, the thrust spindles are screwed into the thrust piece with like handed threads and are coupled together by a toothed belt, then in the event they are inadvertently rotated in this way in the direction which effects application, an excessive application of the brakes can result. And if inadvertently rotated in the opposite direction an undesired release can be effected.

According to another preferred embodiment of the invention, the threads for screwing the thrust spindles into the thrust piece are of opposite hands. Thereby they mutually counteract undesired rotation. In the case of a ganging or synchronizing drive in the form of a toothed belt, it is not possible to achieve screwing of the thrust spindles in opposite senses.

It is further preferred to provide an angle drive between the operating shaft and the thrust spindles.

The coupling of the operating shaft to the freewheeling clutch may be of arbitrary type. It is preferred according to the invention, however, that the operating shaft is a profiled shaft which extends through an operating ring having a corresponding inner profile, which ring is a member of the freewheeling clutch; wherewith the engagement play between the outer profile of the operating shaft and the inner profile of the operating ring determines the braking air gap. To produce a reverse rotational torque when releasing the brake, according to the invention the force dependent freewheeling clutch drive may be provided with a helical spring which friction locks in abutting relationship against the driven side of the freewheeling clutch system.

BRIEF DESCRIPTION OF THE DRAWINGS

The invention will now be described in more detail hereinbelow with the aid of a preferred embodiment, with reference to the accompanying drawings which show additional features, wherein.

DETAILED DESCRIPTION

Figure 1:
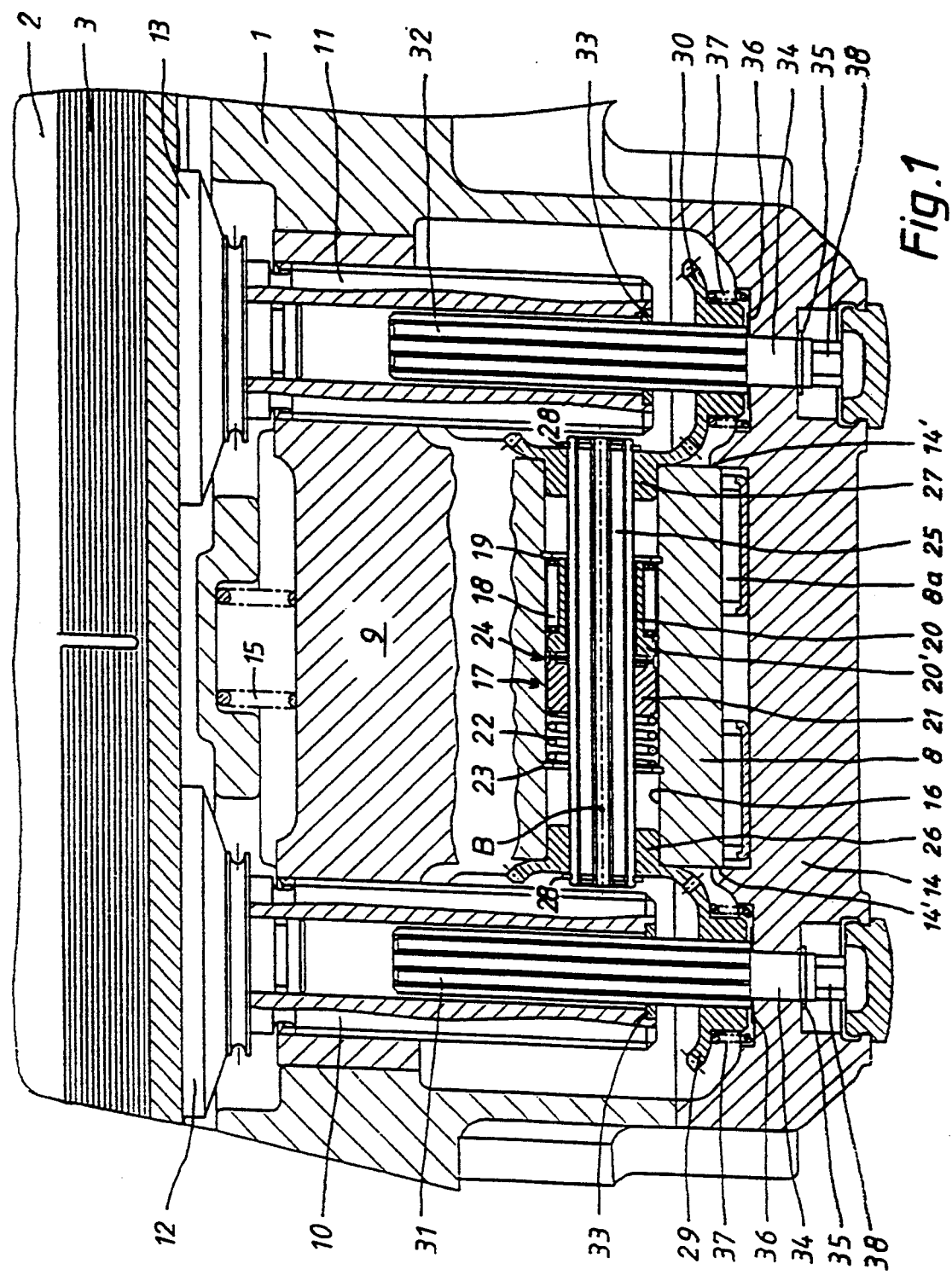
FIG. 1 is a cross-sectional view parallel to the brake axis, through a sliding-caliper disc brake with an operating mechanism according to the invention.

The disc brake illustrated in the drawings includes a caliper 1 having two legs on opposite sides of a brake disc 2 in customary fashion. On both sides of the brake disc 2, brake linings (3, 4) are guided and supported, in a brake bracket or brakehead 5 or on the caliper. The housing of the caliper 1 is mounted so as to be slidable, i.e. slidably adjustable perpendicularly to the brake disc 2, by means of guide means not shown. A brake application mechanism 6 is provided for actuating the brake.

The application mechanism 6 is comprised essentially of brake lever 7 with a brake shaft 8 which shaft is rotatably mounted on an axis disposed in a plane parallel to the brake disc, and a thrust piece 9 which is axially slidably mounted in the housing of the caliper 1.

In plane A of the brake axis (shown in FIG. 1), two thrust spindles 10, 11 are screwed into the thrust piece 9. The thread of the thrust spindle 10 and the corresponding thread of the thrust piece 9 are of an opposite hand to the thread of the thrust spindle 11 and its corresponding thread in thrust piece 9; consequently they mutually tend to counteract spurious rotation. The caliper feet 12, 13 are mounted by inserting mounting members thereon into the thrust spindles 10, 11.

The brake lever 7 provides the connection between a brake cylinder or brake linkage (not shown) and the brake shaft 8.

The brake shaft 8 is mounted so as to be rotatable between the thrust piece 9 and the back part of the housing of the brake caliper or a cover 14.

Shaft 8 has a contoured member which is such that when the shaft is rotated it brings about actuation of the thrust piece 9. Said contoured member may be, e.g., a cam, an eccentric, an involute gear, or the like. When the brake shaft 8 is rotated around an axis B, the cam, eccentric, involute gear, or the like causes the thrust piece 9 to be slid in the direction toward the brake disc 2. The rotational axis B is translationally neutral, i.e. it does not translate with respect to the housing of the caliper 1 when the brake shaft 8 is rotated.

A compression spring 15 is braced against the housing of the caliper on one side and against the thrust piece 9 on the other, so that it presses the thrust piece 9, and thereby the brake shaft 8, against the cover 14, via roller bearings 8a.

The brake shaft 8 has a through opening 16 which is concentric with its axis of rotation B. An operating mechanism for the two thrust spindles (10, 11), which mechanism is generally designated 17, is disposed in the opening 16. The mechanism 17 is directly coupled to the brake shaft 8.

A bushing-type freewheeling clutch 18 is pressed into the opening 16 of the brake shaft 8, viz. against a retaining ring 19. For torque transmission, the freewheeling clutch 18 is mounted on an operating bushing (drive bushing) 20, the radial collar part 20' of which is braced against the outer ring of the clutch. The outer ring (not shown) is pressed into opening 16 and thereby is axially fixed. Collar part 20' abuts or is braced against the outer ring whereby bushing 20 is axially fixed. An operating ring (driven ring) 21 is pressed against the operating bushing 20 by a pre-stressed helical spring 22 which in turn is braced against a retaining ring 23 on the brake shaft 8. When the brake is not in the actuated state, a reverse torque is thereby exerted on the operating ring 21 i.e. by means of spring 22, to ensure uniform establishment of the air gap. A detailed description of the features of the brake application and release system will be presented hereinbelow in connection with a description of the operation of the mechanism.

The operating bushing 20 and the operating ring 21 are in form-interlocking engagement via the crown gear coupling 24 which is pre-stressed by the helical spring 22, thereby forming a force-dependent coupling which limits the transmissible torque. Coupling 24 has two parts which are mounted separately on the end faces of bushing 20 and ring 21 facing each other.

A friction coupling (cone or disc type) or the like could be provided in place of the crown gear coupling 24.

An operating shaft 25 in the form of a profiled shaft extends through the operating bushing 20 and the operating ring 21, concentrically to the rotational axis B. According to FIG. 3, the operating ring 21, the driven ring, has an inner profile which is suitable for form-interlocking with the outer profile of the operating shaft 25. In this way the ring 21 may operatively engage the shaft 25 for torque transmission. At the same time, in the event of a jump in the crown gear coupling 24, i.e. where the gears slip out of engagement to limit an excessive torque, the operating ring can be slid axially on the operating shaft 25 against the pre-stressing force of helical spring 22.

The operating bushing 20, as the drive bushing, is maintained rotational with respect to the operating shaft 25.

Between the inner profile of the operating ring 21 and the outer profile of the operating shaft there is an engagement play S (FIG. 3) by which the magnitude of the air gap of the brake is determined.

The operating shaft 25 has mounted on each end thereof a bevel gear 26, 27 having an inner profile which matches the outer profile of the operating shaft 25. The bevel gears are secured on shaft 25 by respective retaining rings 28 engaging in circumferential slots on shaft 25. Accordingly they are rotationally and axially fixed with respect to the operating shaft 25.

To ensure smooth running of the bevel gears 26, 27 with respect to the brake shaft 8, they are mounted laterally against the brake shaft 8 with a slight axial play, and with a slight radial play in the through-opening 16 by means of a shoulder configuration.

The bevel gears 26, 27 mesh with corresponding bevel gears, respectively 29, 30 at an angle of 90° thereto. In this way an angle drive is provided on each side of the brake shaft 8. The angle drive may be accomplished alternatively by means of crown gears, friction wheels, etc.

Each of the bevel gears 29, 30 is rotationally rigidly fixed to a profiled shaft 31, 32, respectively which extends axially in a recess in the corresponding thrust spindle 10, 11, respectively. In order to protect the angular drive against unnecessary stress, the brake shaft 8 is positioned (FIG. 1) axially between two lateral detents 14' on the cover 14.

Figure 3:
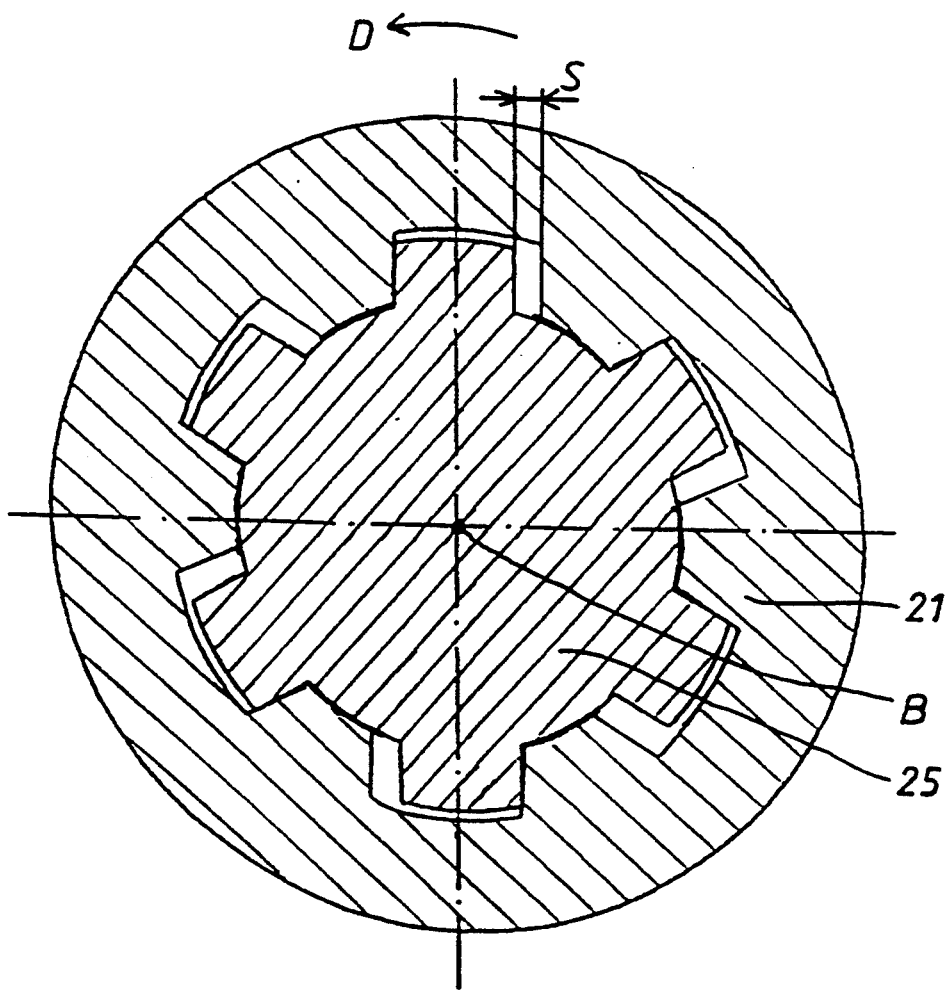
FIG. 3 is an enlarged cross-sectional view through an operating shaft with an associated operating ring.

Similarly to the splined configuration of FIG. 3, except for the gaps S, the profiled shafts 31, 32 are each rotationally rigidly mounted and axially slidable in operation with respect to the respective thrust spindle 10, 11.

The profiles may have any suitable contours, and may be, e.g., in the form of a grooved shaft and spline connection (as in the connection in FIG. 3 as stated above).

Whereas in the exemplary embodiment discussed above the air gap in the brake is determined by a corresponding engagement play S in the connection between operating ring 21 and operating shaft 25, it may also be established by a suitable engagement play between the profiled discs 33 fixed in the ends of thrust spindles 10, 11 and the respective profiled shafts 31, 32.

On each profiled shaft 31, 32 at the cover 14 a cylindrical extension 34 is provided which is rotatably held in a corresponding opening of the cover 14 by means of a retaining ring 35, or alternatively a spring element or the like. Cap springs 36 are compressively mounted between the shoulders of the respective profile shafts 31, 32 and the cover 14, in order to provide frictional torsional resistance on the profiled shafts 31, 32 which shafts serve to maintain the established setting of the central operating mechanism 17 when the brake is in the process of being released.

It is also conceivable that the retaining rings 35 and cap springs 36 may be replaced by force elements which simultaneously perform the holding and spring loading functions.

The bevel gears 29, 30 mounted on the profiled shafts 31, 32 are axially slidable along the shafts 31, 32. They are forced against their mating bevel gears 26, 27 by means of compression springs 37 which abut against the cover 14. This ensures that the gears are constantly engaged, and that tolerances in positioning and manufacturing are compensated for.

The sizes of the gears 26, 27, 29, 30 may be chosen as a function of the desired transmission ratio.

An exterior contour 38 is formed on the respective ends of the cylindrical extensions 34, whereby the profiled shafts 31, 32 can be screwed in or out with an associated tool. Obviously, an inner contour may be provided instead of an outer contour 38. In this way the thrust spindles 10, 11 can be reset from outside, i.e. from the side of the thrust piece 9 which is directed away from the brake disc, in the event of a change of the lining. This resetting occurs namely by rotating one or both thrust spindles. In the prior art, only one thrust spindle is provided with resetting means; this leads to problems if due to the geometric conditions of the brake it is difficult to access that one thrust spindle.

The operation of the exemplary embodiment of the invention illustrated in the drawings will be described hereinbelow.

Figure 2:
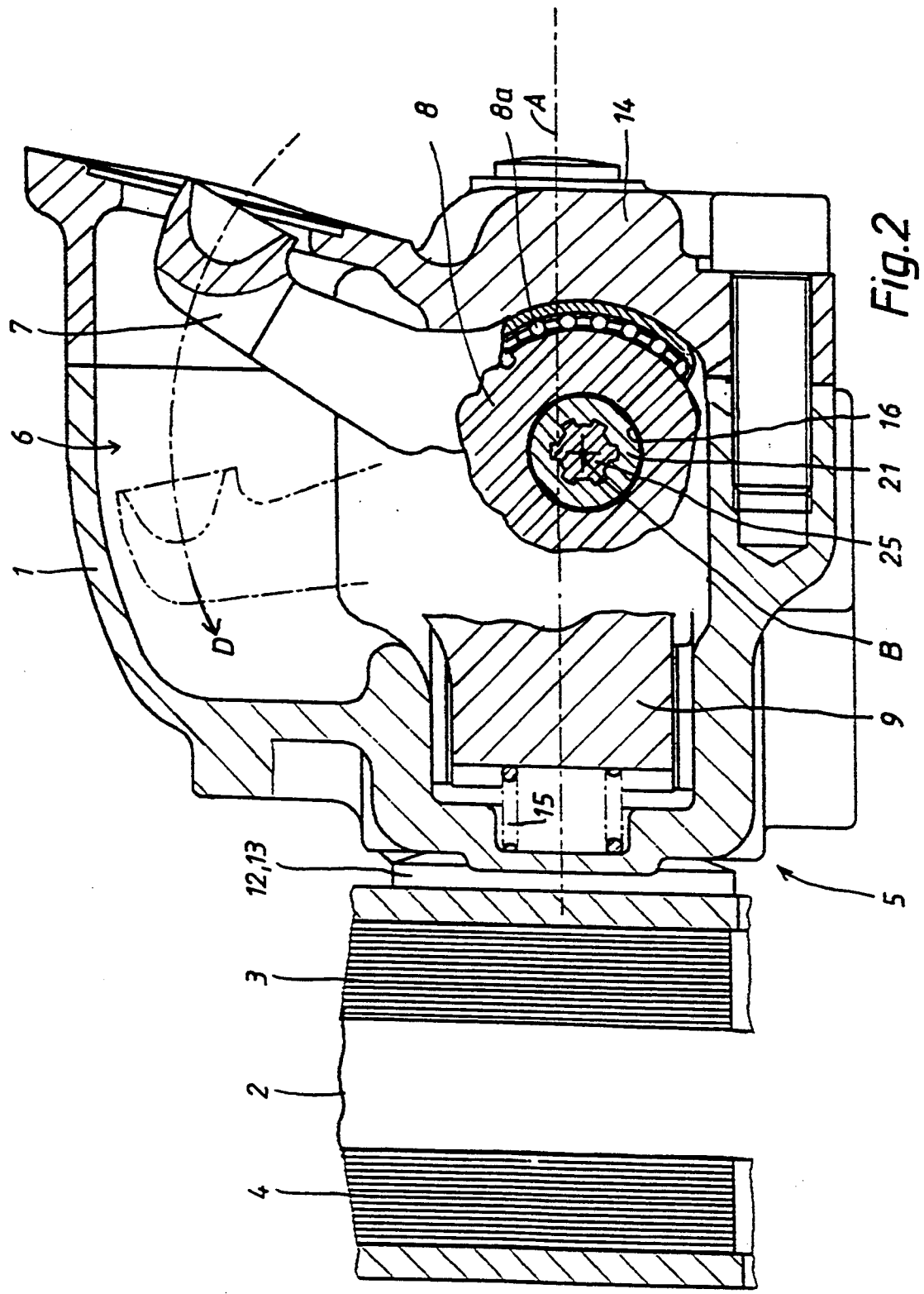
FIG. 2 is a cross-sectional view parallel to the brake axis but perpendicular to the cross-sectional view according to FIG. 1.

In the inactive state of the brake the linings 3, 4 have an air gap to the brake disk 2 which is determined by the engagement play S (FIG. 3) between the profiles of the operating ring 21 and operating shaft 25. When the brake application mechanism 6 is actuated, the brake lever is swung in the direction of arrow D (FIG. 2), thereby causing the brake shaft 8, which is supported against the cover 14 by the roller bearings 8a, to rotate around rotational axis B. The rotational axis B is fixed in position, because it is concentric to the circle described by the roller hearings 8a.

The rotation of the brake shaft 8 results in an increase in its contour toward the brake disc 2, and accordingly the thrust piece 9 in plane A of the brake axis is translated toward the brake disc 2 and against the prestressed force of the compression spring 15. The thrust spindles 10, 11 screwed into the thrust piece 9, with their caliper feet and the brake lining 3 (FIG. 1), are carried along with this movement.

Because the location of the rotational axis B of the brake shaft 8 is fixed, the central operating mechanism 17 and the profiled shafts 31, 32 held on the housing of the caliper 1 are not carried along with this movement.

When the brake shaft 8 is rotated it carries the outer ring of the bushing type freewheeling clutch 18 (which ring is fixed in the through opening 16) in rotation along with it, whereby the clutch couples by its clutch action to the operating bushing 20 and drives the bushing 20 in rotation. The operating ring 21 is coupled to the operating bushing 20 by means of the springloaded (by helical spring 22) corona gear coupling 24, and thereby the operating ring 21 is also rotationally driven. Initially, a rotational excursion of the operating ring 21 does not result in a rotational excursion of the operating shaft 25 because of the engagement play S and the above-mentioned mounting play of the bevel gears 26, 27, in the absence of friction locking with respect to the rotating brake shaft 8, and the fact that the cap springs 37 exert a frictional torque on the profiled shafts 31, 32 and thus on the angle drive. Therefore, any undesired rotation is excluded. If during the application phase of the linings 3, 4 (FIGS. 1 and 2) against the brake disc 2, during which no appreciable stresses are acting on the entire braking system, the engagement play S between the operating ring 21 and the operating shaft 25 is taken up and exceeded, then the operating ring 21 finally will rotate the operating shaft 25 in engagement with it, in accordance with the swinging excursion of the brake lever 7. Because the spring force of the helical spring 22 acting on the corona gear coupling 24 is greater than the friction force of the cap springs 36, the bevel gears 26, 27; 29, 30 forming the angle drive are rotated as well, along with the profiled shafts 31, 32. Accordingly, the thrust spindles 10, 11 are thereby also screwed out from the thrust piece 9, to bring about a current application with wear on the linings.

When the linings 3, 4 are applied to the brake disc 2, the screw threaded pairs between the thrust spindles 10, 11 on the one hand and the thrust piece 9 on the other increase the friction force in such a way that the limiting force of the central operating mechanism 17 is exceeded, and therefore the spindles are not screwed out any further. Accordingly, the profiled shafts 31, 32, the two angle drives, the operating shaft 25, and the operating ring 21 are also not rotated further, so that they remain in their then condition with respect to the brake shaft 8 which may continue to be rotated further in accordance with the swinging excursion of the brake lever 7. Because when the brake shaft 8 is rotated further the operating bushing 20 is carried further in rotational movement in the direction of the swinging excursion of the brake lever 7 by the bushing-type clutch 18, the operating bushing 20 provided with the springloaded crown gear coupling 24 jumps with respect to the now stationary operating ring 21 by a rotational excursion which is determined by an addition of the deformation of the brake parts under further stressing and the amount of lining wear during the braking process.

When the brake is released, the brake application mechanism 6 is de-actuated by the compression spring 15, and the brake shaft 8 rotates back in the return direction of the swinging excursion of the brake lever 7. This back-rotation carries along the pressed-in bushing-type freewheeling clutch in reverse rotation. Because of the frictional torque of the cap springs 37, the profiled shafts 31, 32, the angle drives, and the operating shaft 25 remain unmoved. However, the springloaded corona gear coupling 24 is back-rotated with the brake shaft 8, in the released freewheeling direction of the bushing-type freewheeling clutch 18, on account of the friction of the helical spring 22 abutting against the brake shaft 8, whereby such back-rotation of coupling 24 continues until the operating ring 21@ again rests against the profile of the now unmoving operating shaft 25, after having reestablished the engagement play S. After that, the force of the cap springs 36 will exceed the force of the spring-loaded friction of the helical spring 22, and the operating ring 21 and operating bushing 20 will remain in the position reached.

The remainder of the back-rotation of the brake shaft 8 continues to be in the released direction of the bushing-type freewheeling clutch 18, leaving a [full] excursion available for the next application step when the brake comes to be actuated again.

The resetting process will now be described, for changing the openings in the above-described embodiment of the inventive operating mechanism.

If the profiled shaft 31 is screwed by a tool via its outer contour 38 so that it moves oppositely to its axial direction of movement for actuation of the brake, its associated thrust spindle 10 is screwed back into the thrust piece 9. At the same time, the operating shaft 25 is rotated along with shaft 31, via the angle drive 29, 26, and the spring pre-loaded operating ring 21 slips with respect to the operating bushing 20 which is non-rotationally held in the engaged direction by the bushing-type freewheeling clutch 18. At the same time, on the other side of the operating shaft, the profiled shaft 32 is driven via the angle drive 27, 30, and shaft 32 in turn screws the thrust spindle 11 back into the thrust piece 9.

Analogously, there is a synchronous reverse screwing of the thrust spindles 10, 11 when the profiled shaft 32 is actuated by a tool by way of its outer contour 38.

The features of the invention disclosed in the specification, claims and drawings may be essential to the realization of the invention when said features are taken individually or in any of their combination.

We claim:

1. An operating mechanism for a sliding caliper disc brake having a caliper housing a thrust element slidably mounted in said housing for reciprocating movement toward and away from a brake disc, at least two thrust spindles rotatably mounted in screw threaded engagement in said thrust element and each having one end abutting against a brakehead, brake linings on said brakehead for engaging against said brake disc when the brake is actuated, a brake shaft rotatably mounted in said housing so that rotation of said brake shaft about an axis of rotation thereof in an actuating direction moves said thrust element toward said brake disc and rotation in the opposite direction retracts said thrust element away from said brake disc, and a force dependent freewheeling clutch drive rotationally coupled on one side thereof to said brake shaft and on the other side thereof to said at least two thrust spindles, said operating mechanism comprising:
    a recess in said brake shaft; and
    operating means for rotationally coupling said clutch drive to said at least two thrust spindles comprising an operating shaft extending through said recess concentrically to said axis of rotation of said brake shaft and engageable with said clutch drive.

2. The operating mechanism as claimed in claim 1 wherein:
    said freewheeling clutch drive is disposed in said recess in said brake shaft.

3. The operating mechanism as claimed in claim 2 wherein:
    said at least two thrust spindles engage said thrust element by relatively opposite screw threads.

4. The operating mechanism as claimed in claim 3 wherein said operating means further comprises:
    angular drive means between said operating shaft and said at least two thrust spindles.

5. The operating mechanism as claimed in claim 4 wherein:
    said clutch drive comprises an operating ring having an inner circumferential profile; and
    said operating means further comprises said operating shaft extending through said operating ring and having an outer circumferential profile interengaging with said inner circumferential profile of said operating ring, and circumferential play between said outer and inner profiles to facilitate limited relative rotation between said operating shaft and said operating ring determining brake clearance between said brake lining and said brake disc when said brake is in a non-actuated position.

6. The operating mechanism as claimed in claim 5 wherein said freewheeling clutch drive comprises:
    a driving side engageable with said brake shaft;
    a driven side engaging said operating shaft; and
    a helical compression spring having a first end frictionally abutting against said driven side and a second end in abutting engagement with said brake shaft for resiliently urging said driven side toward frictional engagement with said driving side.

7. The operating mechanism as claimed in claim 3 wherein:
    said clutch drive comprises an operating ring having an inner circumferential profile; and
    said operating means further comprises said operating shaft extending through said operating ring and having an outer circumferential profile interengaging with said inner circumferential profile of said operating ring, and circumferential play between said outer and inner profiles to facilitate limited relative rotation between said operating shaft and said operating ring determining brake clearance between said brake lining and said brake disc when said brake is in a non-actuated position.

8. The operating mechanism as claimed in claim 2 wherein said operating means further comprises:
    angular drive means between said operating shaft and said at least two thrust spindles.

9. The operating mechanism as claimed in claim 2 wherein:
    said clutch drive comprises an operating ring having an inner circumferential profile; and
    said operating means further comprises said operating shaft extending through said operating ring and having an outer circumferential profile interengaging with said inner circumferential profile of said operating ring, and circumferential play between said outer and inner profiles to facilitate limited relative rotation between said operating shaft and said operating ring determining brake clearance between said brake lining and said brake disc when said brake is in a non-actuated position.

10. The operating mechanism as claimed in claim 2 wherein said freewheeling clutch drive comprises:
    a driving side engageable with said brake shaft;
    a driven side engaging said operating shaft; and
    a helical compression spring having a first end frictionally abutting against said driven side and a second end in abutting engagement with said brake shaft for resiliently urging said driven side toward frictional engagement with said driving side.

11. The operating mechanism as claimed in claim 1 wherein:
said at least two thrust spindles engage said thrust element by relatively opposite screw threads.

12. The operating mechanism as claimed in claim 11 wherein said operating means further comprises:
angular drive means between said operating shaft and said at least two thrust spindles.

13. The operating mechanism as claimed in claim 11 wherein:
said clutch drive comprises an operating ring having an inner circumferential profile; and
said operating means further comprises said operating shaft extending through said operating ring and having an outer circumferential profile interengaging with said inner circumferential profile of said operating ring, and circumferential play between said outer and inner profiles to facilitate limited relative rotation between said operating shaft and said operating ring determining brake clearance between said brake lining and said brake disc when said brake is in a non-actuated position.

14. The operating mechanism as claimed in claim 11 wherein said freewheeling clutch drive comprises:
a driving side engageable with said brake shaft;
a driven side engaging said operating shaft; and
a helical compression spring having a first end frictionally abutting against said driven side and a second end in abutting engagement with said brake shaft for resiliently urging said driven side toward frictional engagement with said driving side.

15. The operating mechanism as claimed in claim 1 wherein said operating means further comprises:
angular drive means between said operating shaft and said at least two thrust spindles.

16. The operating mechanism as claimed in claim 15 wherein:
said clutch drive comprises an operating ring having an inner circumferential profile; and
said operating means further comprises said operating shaft extending through said operating ring and having an outer circumferential profile interengaging with said inner circumferential profile of said operating ring, and circumferential play between said outer and inner profiles to facilitate limited relative rotation between said operating shaft and said operating ring determining brake clearance between said brake lining and said brake disc when said brake is in a non-actuated position.

17. The operating mechanism as claimed in claim 15 wherein said freewheeling clutch drive comprises:
a driving side engageable with said brake shaft;
a driven side engaging said operating shaft; and
a helical compression spring having a first end frictionally abutting against said driven side and a second end in abutting engagement with said brake shaft for resiliently urging said driven side toward frictional engagement with said driving side.

18. The operating mechanism as claimed in claim 1 wherein:
said clutch drive comprises an operating ring having an inner circumferential profile; and
said operating means further comprises said operating shaft extending through said operating ring and having an outer circumferential profile interengaging with said inner circumferential profile of said operating ring, and circumferential play between said outer and inner profiles to facilitate limited relative rotation between said operating shaft and said operating ring determining brake clearance between said brake lining and said brake disc when said brake is in a non-actuated position.

19. The operating mechanism as claimed in claim 18 wherein said freewheeling clutch drive comprises:
a driving side engageable with said brake shaft;
a driven side engaging said operating shaft; and
a helical compression spring having a first end frictionally abutting against said driven side and a second end in abutting engagement with said brake shaft for resiliently urging said driven side toward frictional engagement with said driving side.

20. The operating mechanism as claimed in claim 1 wherein said freewheeling clutch drive comprises:
a driving side engageable with said brake shaft;
a driven side engaging said operating shaft; and
a helical compression spring having a first end frictionally abutting against said driven side and a second end in abutting engagement with said brake shaft for resiliently urging said driven side toward frictional engagement with said driving side.

* * * * *